US012699675B2

(12) United States Patent
Fernando et al.

(10) Patent No.: US 12,699,675 B2
(45) Date of Patent: Aug. 4, 2026

(54) MANAGED FOLDERS

(71) Applicant: WORKSTORM.COM LLC, Chicago, IL (US)

(72) Inventors: Raj Fernando, Chicago, IL (US); Anatoliy Yudovich, Riverwoods, IL (US); Michael Barry, Chicago, IL (US); Nicholas Stech, Chicago, IL (US); Harris Dinga, Chicago, IL (US)

(73) Assignee: WORKSTORM.COM, LLC, Chicago, IL (US)

( * ) Notice: Subject to any disclaimer, the term of this patent is extended or adjusted under 35 U.S.C. 154(b) by 13 days.

(21) Appl. No.: 18/621,422

(22) Filed: Mar. 29, 2024

(65) Prior Publication Data

US 2025/0307212 A1 Oct. 2, 2025

(51) Int. Cl.
G06F 16/10 (2019.01)
G06F 16/16 (2019.01)
H04L 51/04 (2022.01)

(52) U.S. Cl.
CPC ............ G06F 16/168 (2019.01); H04L 51/04 (2013.01)

(58) Field of Classification Search
None
See application file for complete search history.

(56) References Cited

U.S. PATENT DOCUMENTS

| | | | | |
|---|---|---|---|---|
| 7,529,796 B2 * | 5/2009 | Riddle | ................. | H04L 65/403 |
| | | | | 709/227 |
| 7,996,469 B1 * | 8/2011 | Wang | ..................... | H04L 51/04 |
| | | | | 709/204 |
| 11,061,552 B1 * | 7/2021 | Pestoni | ............... | G06Q 10/103 |
| 11,553,013 B2 * | 1/2023 | Choi | ...................... | H04L 51/04 |
| 2013/0205229 A1 * | 8/2013 | Post | ........................ | H04L 51/04 |
| | | | | 715/758 |

* cited by examiner

*Primary Examiner* — Belix M Ortiz Ditren
(74) *Attorney, Agent, or Firm* — Sterne, Kessler, Goldstein & Fox P.L.L.C.

(57) ABSTRACT

Disclosed herein are system, method, and computer program product embodiments for managing folders. An embodiment includes a database and a messaging server. The messaging server generates a folder management graphical user interface (GUI) that includes a plurality of input fields for receiving commands. The messaging server and the folder management GUI receive a command from a global matter administrator to create a matter folder and permissions specifying which role a user must have to access the matter folder. The matter folder may carry at least one file and chat channel. In response to the command, the messaging server generates the matter folder in the database. The messaging server controls access to the matter folder as specified in the permissions such that the user is able to view or modify the at least one file and chat channel only if the user has a role allowed within the permissions.

20 Claims, 12 Drawing Sheets

100

300

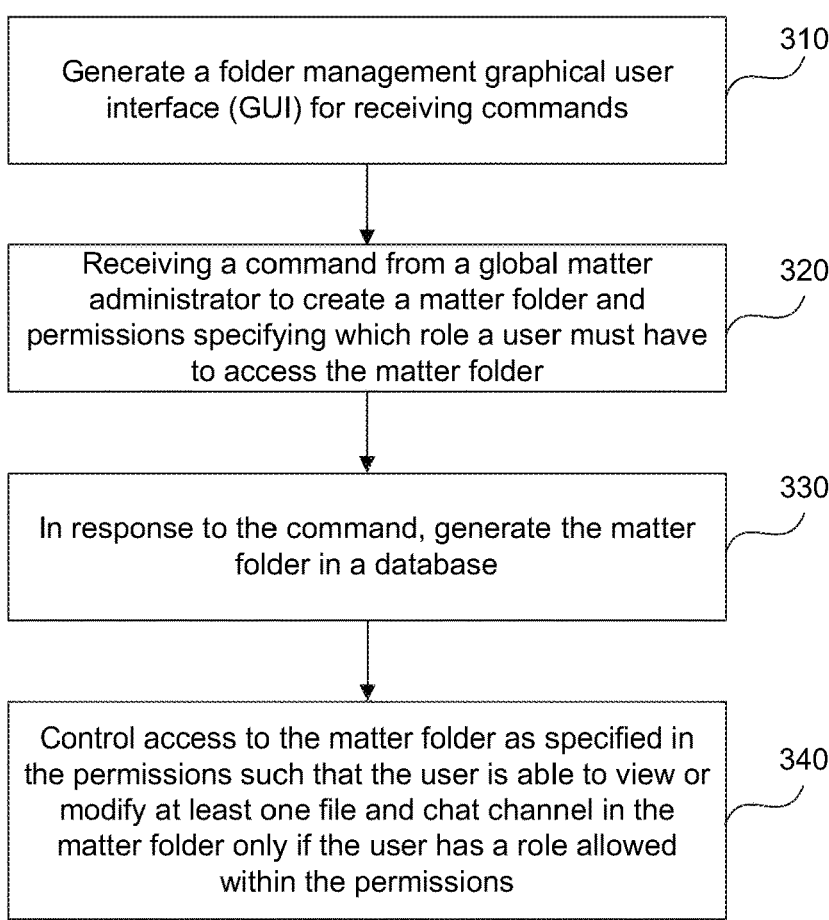

Generate a folder management graphical user interface (GUI) for receiving commands

310

Receiving a command from a global matter administrator to create a matter folder and permissions specifying which role a user must have to access the matter folder

320

In response to the command, generate the matter folder in a database

330

Control access to the matter folder as specified in the permissions such that the user is able to view or modify at least one file and chat channel in the matter folder only if the user has a role allowed within the permissions

MANAGED FOLDERS

BACKGROUND

Field

This field is generally related to a messaging system that provides chat channels and file sharing within a folder structure.

Background

As the demands of the workplace evolve, organizations have started providing employees with messaging systems having chat channels and file sharing capabilities to complete projects. Files related to these projects may be stored in a folder structure and shared through the messaging system. Employees have been responsible for managing their own activities within such messaging systems and folder structures without an administrative system. The absence of an administrative system may lead to inefficient communications, poor project management, and improper data retention. As a result, the use of messaging systems and folder structures without administrative supervision may negatively impact workplace productivity and may raise legal compliance issues.

BRIEF SUMMARY

Accordingly, it is desirable to provide a folder structure that enables users to access content within matter folders in the context of a set of chat channels managed by administrative control.

In an embodiment, a system includes a database and a messaging server. The messaging server may generate a folder management graphical user interface (GUI) that includes a plurality of input fields for receiving commands. The messaging server and the folder management GUI may receive a command from a global matter administrator to create a matter folder and permissions specifying which role a user must have to access the matter folder. The matter folder may carry at least one file and chat channel. In response to the command, the messaging server may generate the matter folder in the database. The messaging server may control access to the matter folder as specified in the permissions such that the user is able to view or modify the at least one file and chat channel only if the user has a role allowed within the permissions.

Computer-implemented method and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the relevant art(s) to make and use the embodiments described herein.

FIG. 3 is a flowchart that illustrates a method for managing folders, according to some embodiments.

Figure 1:
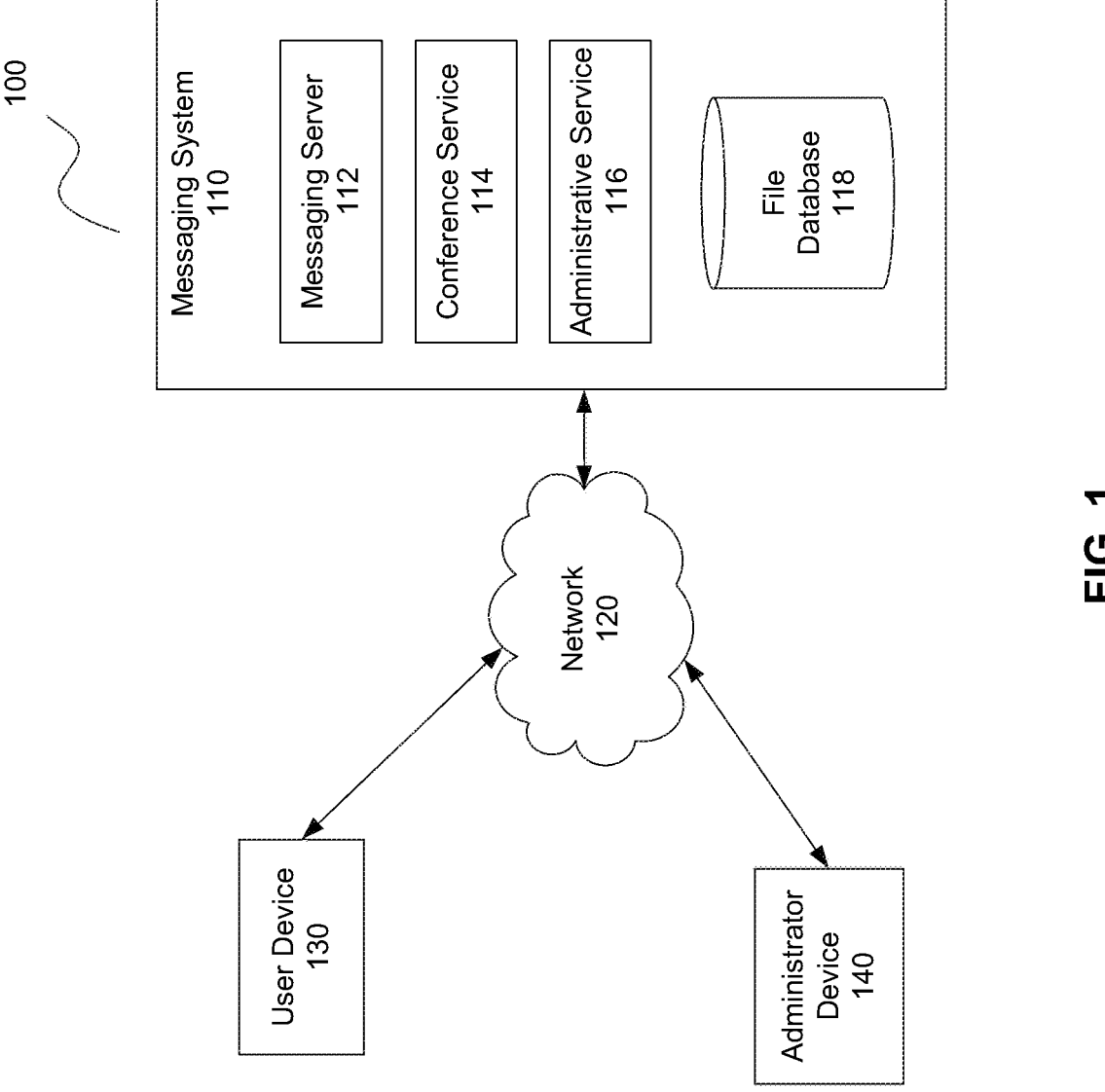
FIG. 1 is a block diagram of a messaging environment, according to some embodiments.

The present disclosure will be described with reference to the accompanying drawings. Generally, the left-most digit (s) of a reference number identifies the drawing in which the reference number first appears.

DETAILED DESCRIPTION

Provided herein are system, apparatus, device, method and/or computer program product embodiments, and/or combinations and sub-combinations thereof, for managing access to content within matter folders through administrative control.

Various embodiments of these features will now be discussed with respect to the corresponding figures.

Example Managed Folder Structure

FIG. 1 is a block diagram of a messaging environment 100, according to some embodiments. Messaging environment 100 includes messaging system 110, network 120, at least one user device 130, and/or at least one administrator device 140. Messaging system 110 may include messaging server 112, conference service 114, administrative service 116, and/or file database 118.

Messaging system 110 may be a computer system such as computer system 1200 described with reference to FIG. 12. Messaging system 110 may be implemented using Internet-based components. For example, messaging system 110 may be implemented using one or more servers and/or databases. Messaging system 110 may facilitate communications between one or more user devices 130. For example, messaging system 110 may facilitate video conferences, audio calls, chat channels, and/or GUIs for communications.

Messaging system 110 may generate matter folders configured to organize data related to a specified project or task. A matter folder may comprise a storage space for data such as, for example, files, file folders, chat channels, a team roster list, or any other information relevant to a project or task, thereby providing a tool for organizing data stored on a computer system or network. For example, a matter folder may be configured to carry at least one file and at least one chat channel.

An administrator may use an administrator device 140 verified by administrative service 116 to control matter folder creation and control access to matter folders within messaging system 110. However, an administrator may not have access to view or modify the content within the matter folder such as, for example, files and chat channels. In an embodiment, an administrator using administrator device 140 may be able to set data storage, export, deletion, and/or retention policies within a matter folder, while being unable to view the content of the data. Accordingly, an administrator's role within messaging system 110 may establish a beneficial privacy layer between content of a matter folder and data governance of a matter folder.

Within messaging environment 100, there may be three types of administrators: global matter administrators (GMAs), compliance officers (COs), and folder administrators (FAs). In one embodiment, a GMA may have administrative permissions to create a matter folder in messaging system 110 and assign FAs to the matter folder. GMAs may not have permissions to view content of files and chat channels within a matter folder. In a business environment, GMA permissions may be established by a company administrator. In one embodiment, a CO may have read-only access to content within a matter folder. COs may have administrative permissions to apply a retention policy or a legal hold to the contents of a matter folder. In a business environment, CO permissions may be established by a company administrator. In one embodiment, an FA may be assigned to a matter folder by a GMA. FAs may have administrative permissions to create chat channels within a matter folder and assign users to the chat channels.

For administrators to manage matter folder creation and access, messaging server 112 may generate a folder management graphical user interface (GUI) that includes a plurality of input fields for receiving commands. Messaging server 112 may receive, via the folder management GUI, a command from a global matter administrator using administrator device 140. Based on the command, messaging server 112 may create a matter folder and permissions specifying which role a user must have to access the matter folder. In response to the command, messaging server 112 may generate the matter folder in file database 118. Messaging server 112 may control access to the matter folder as specified in the permissions such that the user is able to view or modify the at least one file and at least one chat channel only if the user has a role allowed within the permissions.

Access to the matter folder can include read-only permissions of the at least one file and chat channel such that a user may only have to ability to view the contents of the matter folder. For example, a CO may have read-only permissions of the at least one file and chat channel.

Access to the matter folder can include permissions to edit content of the at least one file and chat channel such that a user may view and modify the contents of the matter folder. For example, a user assigned to a matter folder may be able to view and modify their chat channels and associated files.

Access to the matter folder can include administrative permissions to edit permissions for other users in the matter folder. For example, an FA may have administrative permissions to edit permissions for other users in the matter folder. An administrator having administrative permissions may not have read-only permissions or permissions to edit content of the at least one file and chat channel. Alternatively, an administrator having administrative permissions may have read-only permissions of the at least one file and chat channel. Alternatively, an administrator having administrative permissions may have permissions to edit content of the at least one file and chat channel.

Within the managed matter folder structure, messaging system 110 may generate workspaces, which may include one or more graphical user interfaces facilitating message exchanges. The workspaces may include chat panels, file management services, calendar services, meeting and/or video conferencing services, contact management, and/or other communication services. In some embodiments, to facilitate chat message communications, messaging system 110 may instantiate chat panels as well as provide an interface with user client devices, such as computers, laptops, or tablets for messaging and file sharing across messaging server 112.

Messaging server 112 may facilitate chat channel communications. Chat channel communications may include chat, messaging, or textual communications. Chat channels may be used by individual users and/or by groups of users. For example, the chat channels may correspond to direct messages, team group messaging, division group messaging and/or other hierarchical communication structures. To facilitate communications within these chat channels, messaging system 110 may generate chat panels. These chat panels may be displayed on graphical user interfaces on one or more user devices 130.

When facilitating communications via chat channels, the messaging system 110 may transmit messages to users subscribed to a particular chat channel. For example, a user assigned to a particular chat channel may utilize user device 130 to deliver a message to other assigned users. User device 130 may display a graphical user interface for the user to utilize when receiving or delivering messages. The user may use user device 130 to connect to messaging system 110, which may be configured to instantiate the chat panel. In some embodiments, messaging system 110 instantiates multiple chat panels, allowing many users to subscribe to one or more chat channels.

Messaging system 110 also includes conference service 114. Conference service 114 facilitates video conferences and/or audio calls between participants. For example, participants may use user devices 130 to join a video conference. Messaging system 110 may also facilitate chat communications for the participants of the video conference and/or audio call. For example, messaging system 110 may generate a chat channel for the video conference and/or audio call. In some embodiments, a chat channel may already exist. A user may then initiate a video conference and/or audio call with members of the chat channel using messaging system 110.

Administrative service 116 may verify that an administrator such as, for example, a GMA using administrator device 140 has the appropriate permissions to create matter folders or modify matter folder settings on messaging server 112. Administrative service 116 also may verify that an administrator such as, for example, a GMA using administrator device 140 has the appropriate permissions to control or modify permissions for users and other administrators of messaging system 110. A company administrator may set the administrative permissions that administrative service 116 verifies.

In some embodiments, messaging system 110 may also store and/or manage files. For example, these files may be stored in file database 118. File database 118 may also facilitate the storage and/or sharing of these files in chat channels. In some embodiments, user devices 130 and/or administrator devices 140 may upload files and/or data from a local system for sharing. Messaging system 110 may facilitate the uploading of a file by the user devices 130 and/or administrator devices 140 and/or interface with messaging server 112 to share the uploaded file in a chat panel. In some embodiments, file database 118 may include the ability to interface with external file databases such as, for example, Box or FileSite.

Messaging system 110 may communicate with user devices 130 and/or administrator devices 140 via network 120. Network 120 may include any combination of wired and/or wireless networks, which may include mobile communication networks, Local Area Networks (LANs), Wide Area Networks (WANs), and/or the Internet. Messaging system 110 may use a communication interface to perform this communication. The communication interface may interface with these networks to implement bidirectional communications with one or more user devices 130 and/or administrator devices 140.

User device 130 and administrator device 140 each may be an electronic device with messaging capabilities, such as, for example, a telephone, tablet, computer, laptop, or other smart devices. User device 130 and administrator device 140 each may include physical and/or stationary workspaces. In some embodiments, messaging system 110 is implemented in a web-based platform, and user device 130 and administrator device 140 each may use a computer communications protocol to connect to messaging system 110, such as, for example, WebSocket®, HTTP, or BOSH. In an embodiment, user device 130 and administrator device 140 each may install an application to access messaging system 110.

Figure 2:
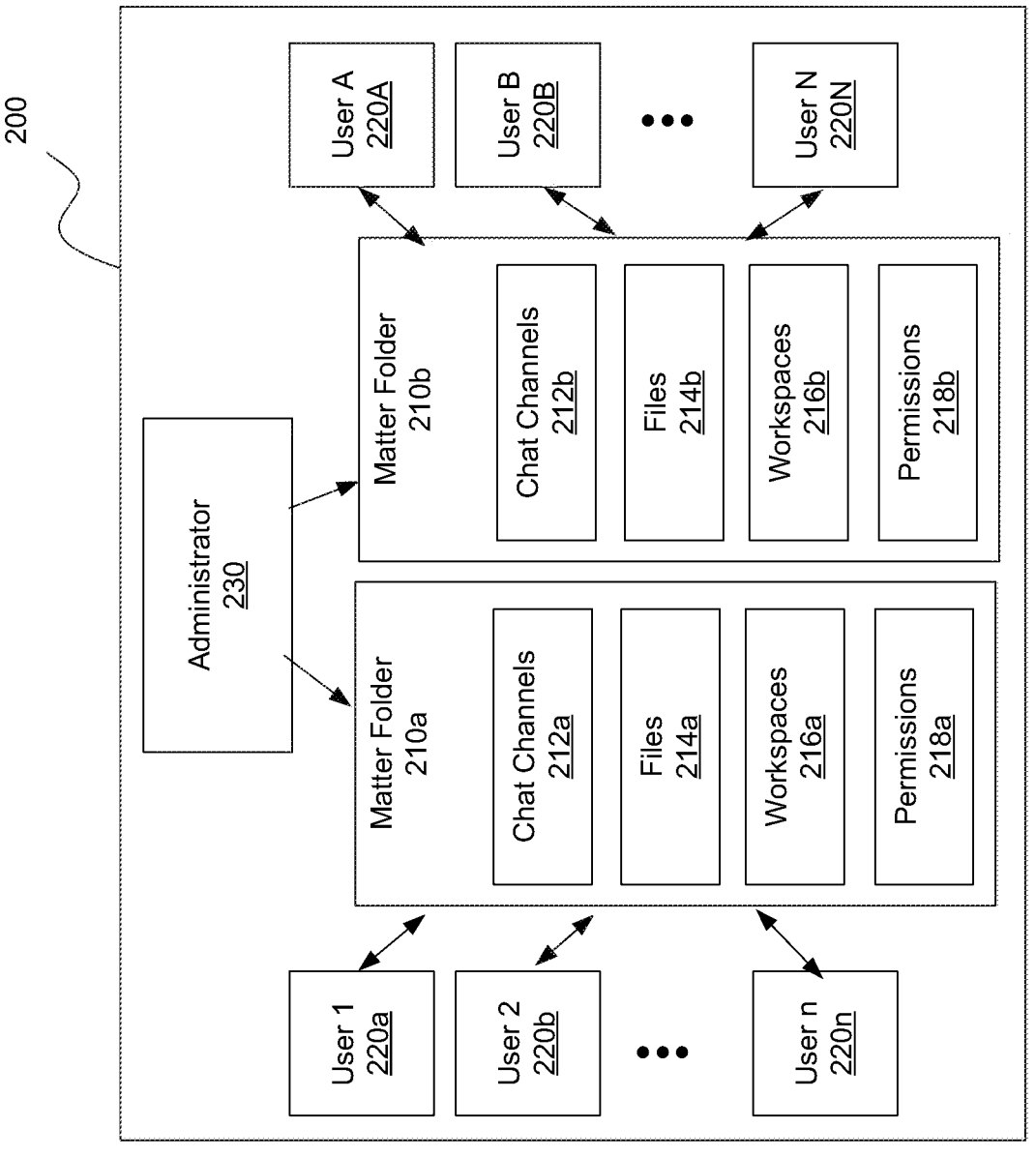
FIG. 2 is a block diagram of a messaging system with matter folders managed by an administrator, according to some embodiments.

FIG. 2 is a block diagram of a messaging system 200 with matter folders 210a, 210b managed by an administrator 230, according to some embodiments. Messaging system 200 comprises matter folders 210a, 210b, users 220a . . . 220N, and administrator 230. Although FIG. 2 depicts two matter folders 210a, 210b (collectively referred to as matter folders 210), six users 220a . . . 220N (collectively referred to as users 220), and one administrator 230, messaging system 200 may comprise any number of matter folders, users, and administrators. In the example embodiment shown in FIG. 2, matter folders 210a, 210b comprise chat channels 212a, 212b (collectively referred to as chat channels 212), files 214a, 214b (collectively referred to as files 214), workspaces 216a, 216b (collectively referred to as workspaces 216), and permissions 218a, 218b (collectively referred to as permissions 218), respectively. Collectively, each matter folder 210 may comprise any number of chat channels 212, files 214, workspaces 216, and permissions 218.

A business organization may utilize messaging system 200 to organize data and teams with a folder structure comprising matter folders 210. Matter folders 210 may represent a particular project or task. For example, a matter folder 210 may represent a certain litigation case or a certain stage of a litigation case. Matter folders 210 may be categorized by a matter name, a matter index, a matter identifier, and/or a matter type. Matter folders 210 may comprise a storage space for data such as, for example, files 214, file folders, chat channels 216, a team roster list, or any other information relevant to a specified project or task, thereby providing a useful tool for organizing data on a computer system or network. For example, each one of matter folders 210 may be configured to carry at least one file 214 and at least one chat channel 216. Access to each one of matter folders 210 may be controlled by its associated permissions 218, as specified by an administrator 230.

Figure 5:
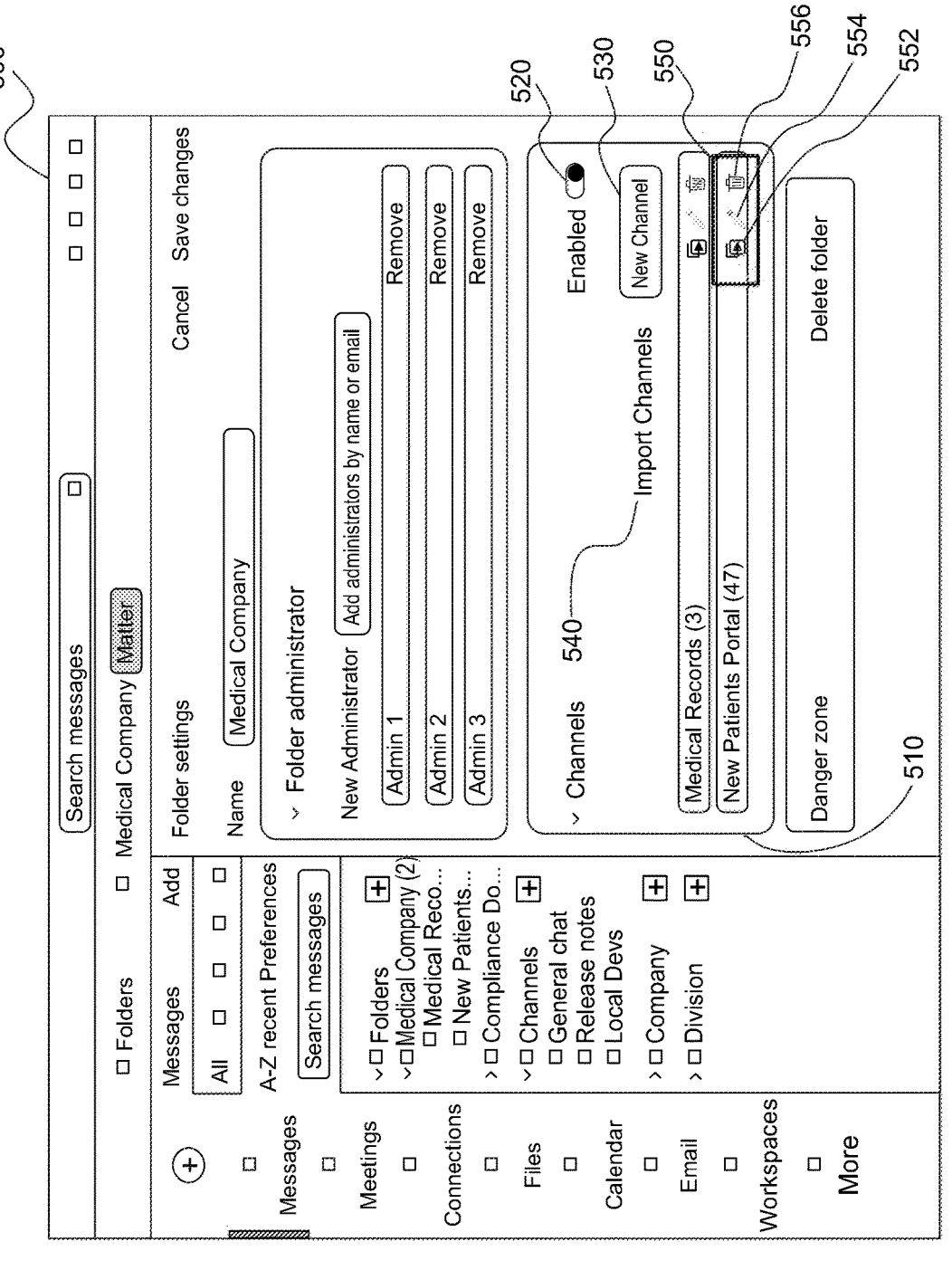
FIG. 5 is a diagram that illustrates a graphical user interface displaying a chat channel settings panel, according to some embodiments.
Figure 6:
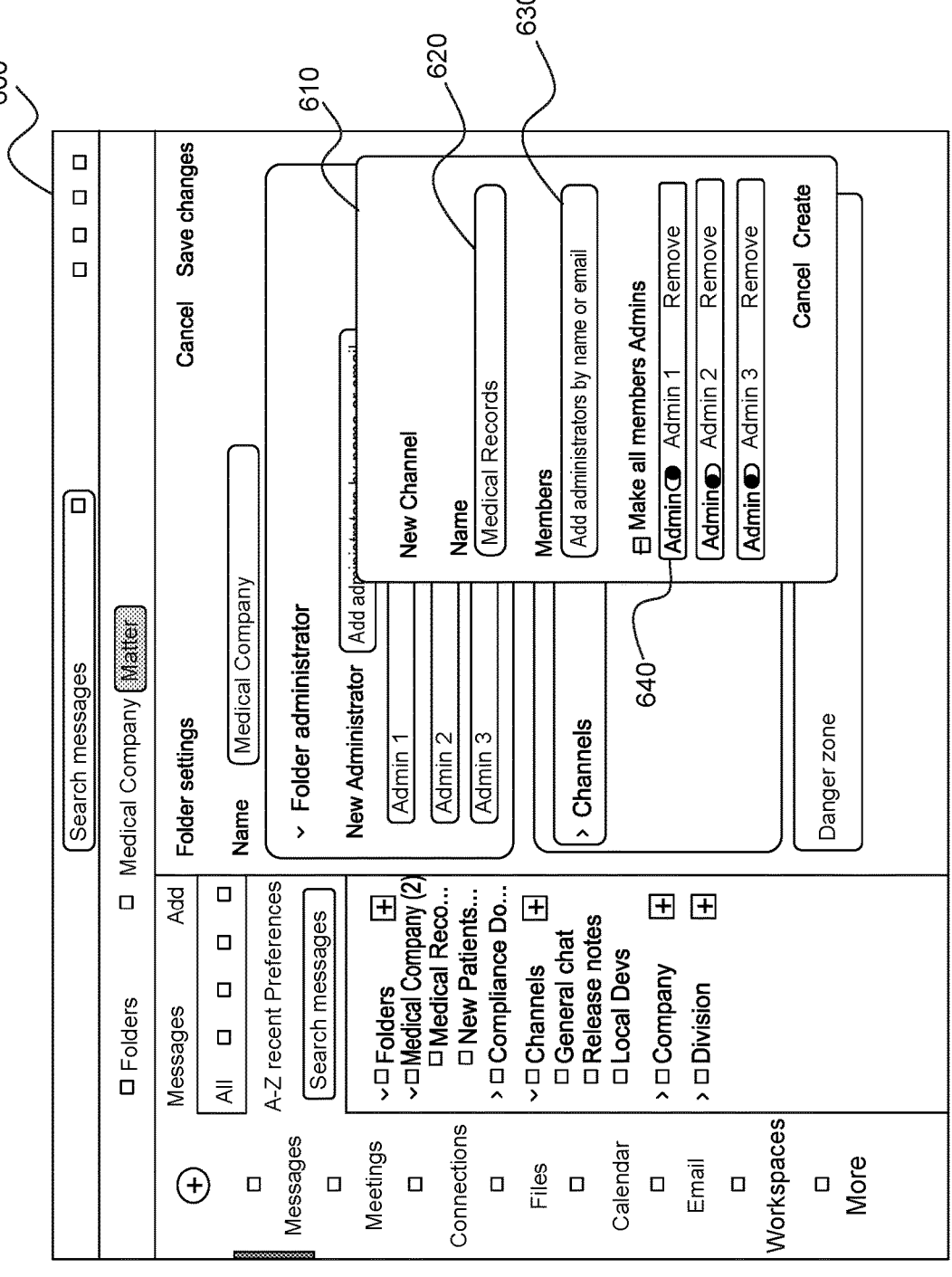
FIG. 6 is a diagram that illustrates a graphical user interface displaying a chat channel creation panel, according to some embodiments.

Administrator 230 may be a folder administrator (FA), as described with reference to FIG. 1. Administrator 230 may assign users 220 to one or more matter folders 210 and any associated chat channels 212 for a specified project. Users 220 with access to the matter folder 210 will then utilize the assigned chat channels 212 to receive communications from each other regarding the project. For example, a team may be a group of attorneys assigned to work on a litigation project. In an embodiment, matter folders 210 are mandatory and specific, meaning users will not be able to leave the matter folder 210 and may only join a matter folder 210 when an FA has determined that the user should be assigned to its associated chat channels 212. For example, if administrator 230 has assigned user 220a to matter folder 210a, then user 220a may not unsubscribe from matter folder 210a without administrator permission. Additionally, the user may not subscribe to matter folder 210b without administrator permission. FIGS. 5-6 provide embodiment of graphical user interface allowing an administrator 230 to create chat channels 212 within matter folders 210 and assign users 220 to those chat channels 212. The managed matter folder structure grants control to administrators 230 to tailor access for the users of chat channels 212, files 214, and workspaces 216 based on their job function within matter folder 210.

Matter folders 210 provide chat channels 212 that allow users 220 to communicate via a real-time message delivery system. Messages may include text, image, video, audio, documents, data files, compressed data files, or transaction information. In an embodiment, chat channels 212 may represent graphical user interfaces for user 220 messaging. Users 220 may view and utilize one or more chat channels 212 to send and receive messages. The graphical user interface of a chat channel 212 also provides a repository or archive of messages, so that assigned users 220 may view some or all of the messages that have ever been sent to the chat channel 212. In an embodiment, each chat channel 212 may represent a team. For example, chat channel 212a may represent a team working on a first project while chat channel 212b represents another team working on a second project.

Matter folders 210 may be used to store files 214. Files 214 may be shared in chat channels 212 that correspond to the matter folder 210. For example, files 214a may only be shared within chat channels 212a to maintain control over sharing permissions for matter folder 210a. Files 214 may be searchable by different categories such as, for example, date, channels, contacts, and/or type.

Matter folders 210 may include workspaces 216. Workspaces 216 may comprise one or more private message, team message, and/or division message embodiments of chat channels 212. Users 220 may send and/or receive messages via these chat channels 212 viewing in the context of a workspace 216. By utilizing a workspace 216, users 220 may be able to select different chat channels 212 to view, select different types of chat channels 212 to view, arrange selected chat channels 212 in a particular layout, and/or preserve the layout of chat channels 212 for later viewing. In this manner, users 220 may arrange or organize chat channels 212 into user-specified workspaces so that users 220 can access one or more chat channels 212 simultaneously. Similarly, users 220 may be able to preserve a specific configuration of chat channels 212 for later use so that users 220 need not create a new arrangement or workspace each time a user 220 accesses the messaging system 200. The messaging system 200 may receive configuration data from a client device and/or store the configuration data in a database for later retrieval and delivery to the client device.

Matter folders 210 may be controlled by associated permissions 218. Permissions 218 may define the type of access that is granted to a user 220 for content within a matter folder 210. Permissions 218 may be defined by any administrator such as, for example, a company administrator, a GMA, a CO, or an FA. As described with reference to FIG. 1, access to a matter folder 210 determined by permissions 218 may comprise at least one of read-only permissions of at least one file 214 and chat channel 212, permissions to edit content of at least one file 214 and chat channel 212, or administrative permissions to edit permissions for other users 220 in the matter folder 210.

Administrator 230, as a user having administrative permissions, may save a matter folder 210 as a matter template, or create a new matter folder 210 from an existing matter template, that includes a set of chat channels 212 and users 220 with their associated permissions 218 defined for a particular type of matter. Administrator 230 may use a matter template for a team of users 220 that works together on multiple matters and uses consistent naming conventions and workflows across the matters. For example, administrator 230 may use a matter template for a litigation team of users 220 that works together on a variety of matters that each represent a stage of the same litigation case. In the example embodiment shown in FIG. 2, administrator 230 may save matter folder 210a as a matter template specifying chat channels 212a, users 220a . . . 220n, and permissions 218a to be replicated for later use upon creating another matter folder 210.

FIG. 3 is a flowchart that illustrates a method 300 for managing folders, according to some embodiments. The foregoing description will describe an embodiment of the execution of method 300 with respect to the components of FIGS. 1 and 2. While method 300 is described with reference to messaging system 110, method 300 may be executed on any computing device, such as, for example, the computer system described with reference to FIG. 12 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

Figure 4:
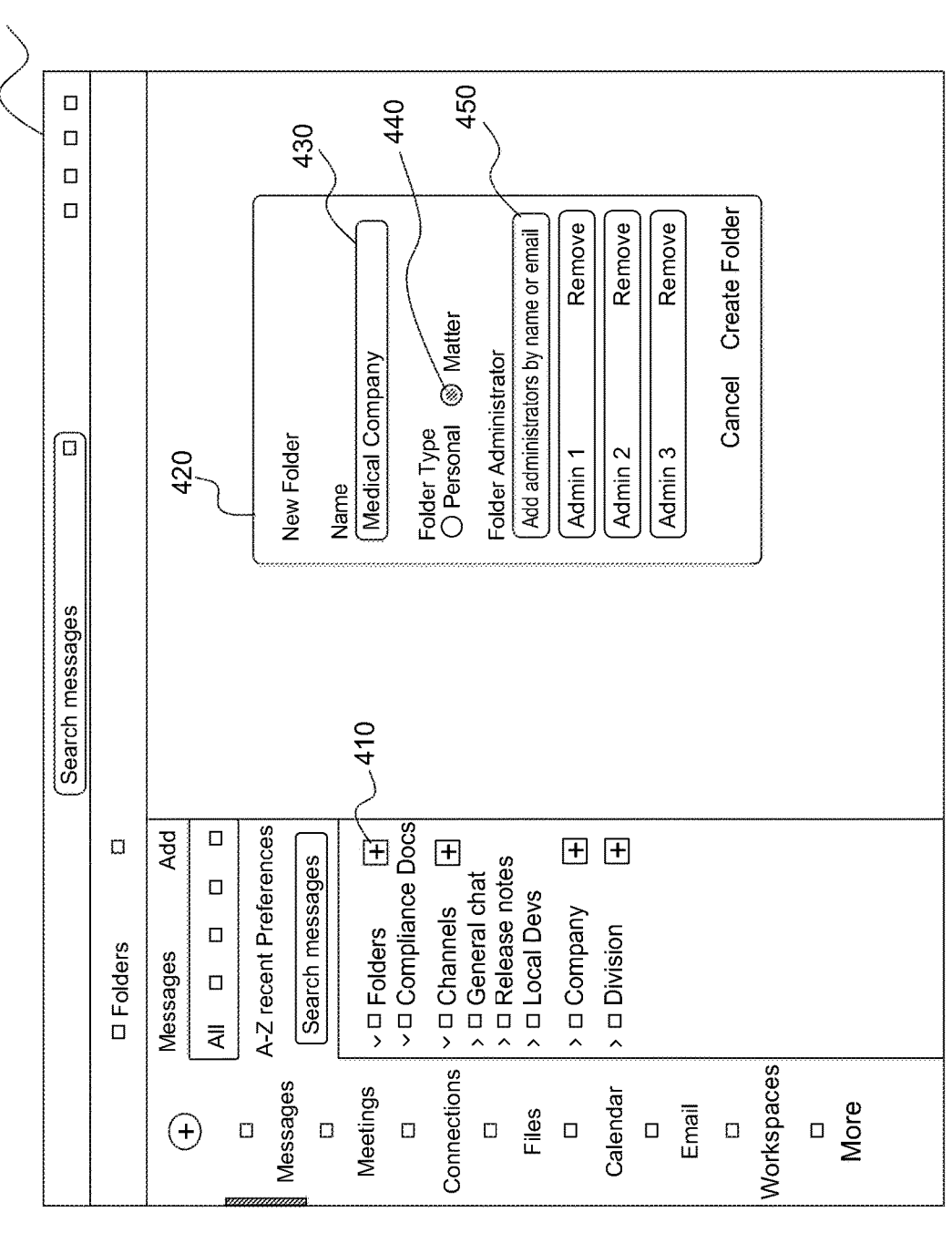
FIG. 4 is a diagram that illustrates a graphical user interface displaying a folder creation panel, according to some embodiments.

At step 310, a messaging server (e.g., messaging server 112 as shown in and described with reference to FIG. 1) can generate a folder management graphical user interface (GUI) that includes a plurality of input fields for receiving commands. FIG. 4 provides an embodiment of the folder management GUI as GUI 400.

At step 320, the messaging server can receive, via the folder management GUI, a command from a global matter administrator to create a matter folder (e.g., matter folder 210 as shown in and described with reference to FIG. 2) and permissions (e.g., permissions 218 as shown in and described with reference to FIG. 2) specifying which role a user (e.g., user 220 as shown in and described with reference to FIG. 2) must have to access the matter folder. The matter folder may be configured to carry at least one file (e.g., files 214 as shown in and described with reference to FIG. 2) and chat channel (e.g., chat channels 212 as shown in and described with reference to FIG. 2). Receiving the command from the global matter administrator comprises at least one of naming the matter folder, designating users having administrative permissions, or removing users having administrative permissions. Access to the matter folder comprises at least one of read-only permissions of the at least one file and chat channel, permissions to edit content of the at least one file and chat channel, or administrative permissions to edit permissions for other users in the matter folder.

At step 330, in response to the command, the messaging server can generate the matter folder in a database (e.g., file database 118 as shown in and described with reference to FIG. 1).

At step 340, the messaging server can control access to the matter folder as specified in the permissions such that the user is able to view or modify the at least one file and chat channel only if the user has a role allowed within the permissions.

Controlling access to the matter folder can include permitting a user having administrative permissions to create any number of chat channels, delete any number of chat channels, assign users to any chat channel, remove users from any chat channel, enable use of chat channels, or disable use of chat channels within the matter folder.

Controlling access to the matter folder can include permitting a user having compliance permissions to view the at least one file and chat channel in a read-only format, set a data retention policy for the at least one file and chat channel, or set a legal hold requirement for the at least one file and chat channel.

In an embodiment, method 300 may further comprise storing characteristics of the matter folder in the database as a matter template specifying one or more chat channels and one or more users and their corresponding permissions associated with a type of matter. In this embodiment, the messaging server can receive, via the folder management GUI, a command from a user having administrative permissions to create a subsequent matter folder based on the matter template. In response to the command, the messaging server can generate, in a database, the subsequent matter folder having the one or more chat channels and the one or more users and their corresponding permissions associated with the type of matter.

Example GUIs for Managing a Folder Structure

FIGS. 4-8 are diagrams of graphical user interfaces allowing different types of users having administrative permissions (e.g., administrators) to interact with matter folders. The graphical user interfaces provide a visual representation of the associated functional aspects of certain administrative permissions. The graphical user interface facilitates receiving inputs from an administrator. In an embodiment, the graphical user interface is a web-based graphical user interface, and can be accessed via any of the common web browsers, such as Internet Explorer, Firefox, Safari, Chrome, etc. In an embodiment, the graphical user interface is an application that runs on a device such as a laptop, computer, a smart phone, or a tablet.

FIG. 4 is a diagram that illustrates a graphical user interface (GUI) 400 displaying a folder creation panel 420, according to some embodiments. GUI 400 is an example interface enabling a GMA to create a matter folder and assign FAs to manage the matter folder. GUI 400 may be generated by messaging system 110 and/or displayed using administrator device 140. Administrator device 140 may receive GUI data from messaging system 110 to construct and/or display GUI 400. GUI 400 includes folder creation button 410, folder creation panel 420, name entry field 430, folder type selector 440, and folder administrator search bar 450.

Folder creation panel 420 may be displayed in response to a user selecting folder creation button 410. Alternatively, selection of folder creation button 410 may open a menu having an option to create a folder, which opens folder creation panel 420 when the option is selected. In response to a cursor hovering over folder creation button 410, a tooltip description may activate to indicates that clicking the icon will open a folder creation panel 420.

Folder creation panel 420 may include a plurality of input fields configured to receive a command. A user may name the folder via name entry field 430. Folder type selector 440 may enable selection of a folder type depending on the user's administrative permissions. A personal folder type, which represents a file folder, may be selected by any user. A matter folder is a non-standard folder type that only may be selected by a GMA. This function may only be available to a GMA to enable an administrative privilege regarding matter folder creation.

In response to a GMA selecting the matter folder type, folder administrator search bar 450 may appear. The GMA may utilize folder administrator search bar 450 by entering names or email addresses corresponding to users to add as FAs to the matter folder. In an embodiment, a GMA may select FAs from a list stored in a database. When a GMA attempts to add a user as an FA, a messaging system may search a database for the corresponding user to aid in adding the user as an FA. In an embodiment, when a GMA adds an FA to a matter folder, the FA may be mandatorily assigned to the matter folder as a manager. Alternatively, the FA may receive administrative permissions to remove themselves from the matter folder upon creation of the matter folder.

In one embodiment, a GMA may cancel creation of the matter folder or may delete the matter folder after it is created.

FIG. 5 is a diagram that illustrates a graphical user interface (GUI) 500 displaying a chat channel settings panel 510, according to some embodiments. GUI 500 is an example interface enabling an FA modify chat channel settings for a matter folder. GUI 500 may be generated by messaging system 110 and/or displayed using administrator device 140. Administrator device 140 may receive GUI data from messaging system 110 to construct and/or display GUI 500. GUI 500 includes chat channel settings panel 510, chat channel switch 520, chat channel creation button 530, chat channel import button 540, and chat channel settings buttons 550.

Chat channel settings panel 510 may enable an FA to control access to chat channels within a managed matter folder. For example, an FA has the administrative permissions to enable or disable the use of chat channels in a particular matter folder by toggling chat channel switch 520. Chat channel switch 520 may affect all chat channels in a matter folder. In one embodiment, all chat channels in a matter folder can be set to disabled. Alternatively, all chat channels in a matter folder can be set to enabled.

Chat channel settings panel 510 may enable an FA to control creation of chat channels within a managed matter folder. In response to an FA selecting chat channel creation button 530, GUI 600 (as described below with reference to FIG. 6) may appear. An FA, as a user having administrative permissions, may create any number of chat channels within a matter folder. In response to an FA selecting chat channel import button 540, an FA may add a pre-existing chat channel to the current matter folder from another matter folder or a matter template.

Chat channel settings panel 510 may enable an FA to modify properties of chat channels within a matter folder. Chat channel settings panel 510 may display a list of the existing chat channels within a matter folder. Each existing chat channel may have by modified by selecting options from chat channel settings buttons 550. In some embodiments, chat channel settings buttons 550 may include a copy button 552, an edit button 554, and a delete button 556. When an FA selects copy button 552, GUI 500 may enable the FA to save a chat channel to a matter template for later use. For example, a chat channel may be saved in a matter template so that a team of users that works together on multiple matters can have consistent communication workflows across the matters. When an FA selects edit button 554, GUI 500 may enable the FA to add or remove users from the chat channel or rename the chat channel within the matter folder. When an FA selects delete button 556, GUI 500 may enable the FA to delete any number of chat channels within the matter folder.

FIG. 6 is a diagram that illustrates a graphical user interface (GUI) 600 displaying a chat channel creation panel 610, according to some embodiments. GUI 600 is an example interface enabling an FA to create a chat channel within a matter folder and assign users to the chat channel. GUI 600 may be generated by messaging system 110 and/or displayed using administrator device 140. Administrator device 140 may receive GUI data from messaging system 110 to construct and/or display GUI 600. GUI 600 includes chat channel creation panel 610, name entry field 620, user search bar 630, and administrative permission switch 640.

Chat channel creation panel 610 may enable an FA to control access to a chat channel within a matter folder and set administrative permissions for users having access. An FA may name the chat channel via name entry field 620.

Chat channel creation panel 610 may enable an FA to add any number of users to chat channels within a matter folder. An FA may utilize user search bar 630 by entering names or email addresses corresponding to users to add as members to the chat channel within the matter folder. In an embodiment, an FA may select users from a list stored in a database. When an FA attempts to add a user, a messaging system may search a database for the corresponding user to aid in adding the user to the chat channel. In an embodiment, when an FA adds a user to a matter folder, the user may be mandatorily assigned to the chat channel. Chat channel creation panel 610 may enable an FA to remove any number of users from chat channels within a matter folder.

Chat channel creation panel 610 may include administrative permission switch 640. Activating administrative permission switch 640 may enable a first FA to grant administrative permissions to a second FA, already appointed by the GMA, to control settings of and access to the chat channel.

Figure 7:
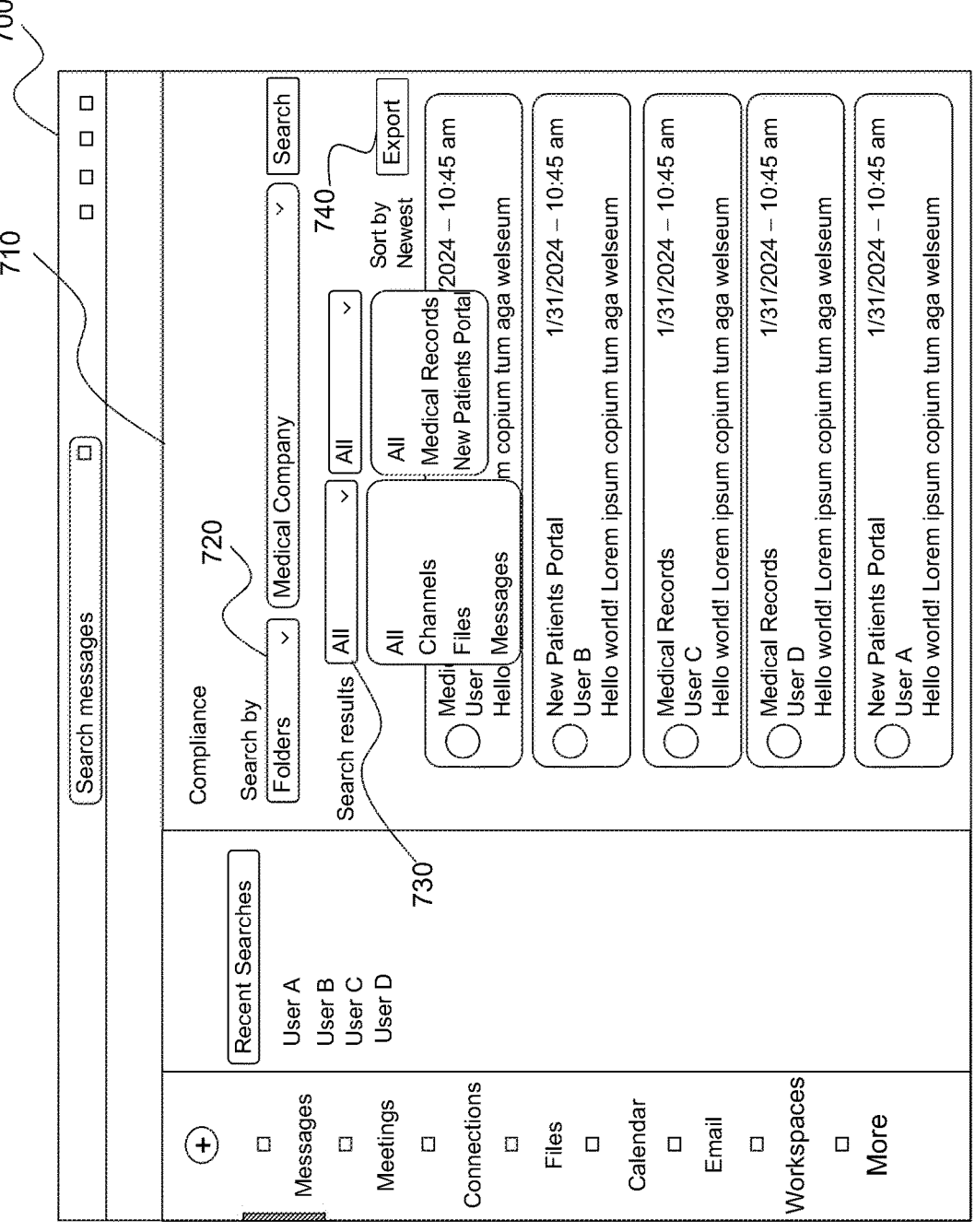
FIG. 7 is a diagram that illustrates a graphical user interface displaying a compliance search panel, according to some embodiments.

FIG. 7 is a diagram that illustrates a graphical user interface (GUI) 700 displaying a compliance search panel 710, according to some embodiments. GUI 700 is an example interface enabling a CO to locate and view content from the entire history of a matter folder. GUI 700 may be generated by messaging system 110 and/or displayed using administrator device 140. Administrator device 140 may receive GUI data from messaging system 110 to construct and/or display GUI 700. GUI 700 includes compliance search panel 710, search entry field 720, search filter 730, and export button 740.

Compliance search panel 710 may enable a CO to locate content in a matter folder. Compliance search panel 710 may enable a CO to search by data type with search entry field 720. In one embodiment, search entry field 720 may be provide a drop-down menu for a CO to search by a matter folder or a user as selection criteria. In one embodiment, search entry field 720 may allow a CO to enter a keyword and/or a search term to identify a message or file. The identifications in these embodiments may identify files and/or messages within a particular chat channel selected and/or across multiple chat channels.

Compliance search panel 710 may enable a CO to sort content in a matter folder. When a CO has confirmed the input for search entry field 720, a list of retrieved files and/or messages within a particular chat channel can appear on GUI 700. Search filter 730 may enable a CO to sort the search results. For example, a CO may be able to filter the results by chat channels, files, or messages.

Compliance search panel 710 may enable a CO to review and export content from a matter folder in a read-only format. For example, a CO may collect and aggregate channels for export for a compliance report. To export content from the matter folder, a CO may select and/or interact with export button 740. After receiving this interaction, GUI 700 may display an additional interface allowing a CO to select a share button. After selecting the share button, the user may export the content to a different data format or may select a chat channel for sharing the content. In some embodiments, messaging system 110 may retrieve the content from file database 118 and transmit the content accordingly.

Figure 8:
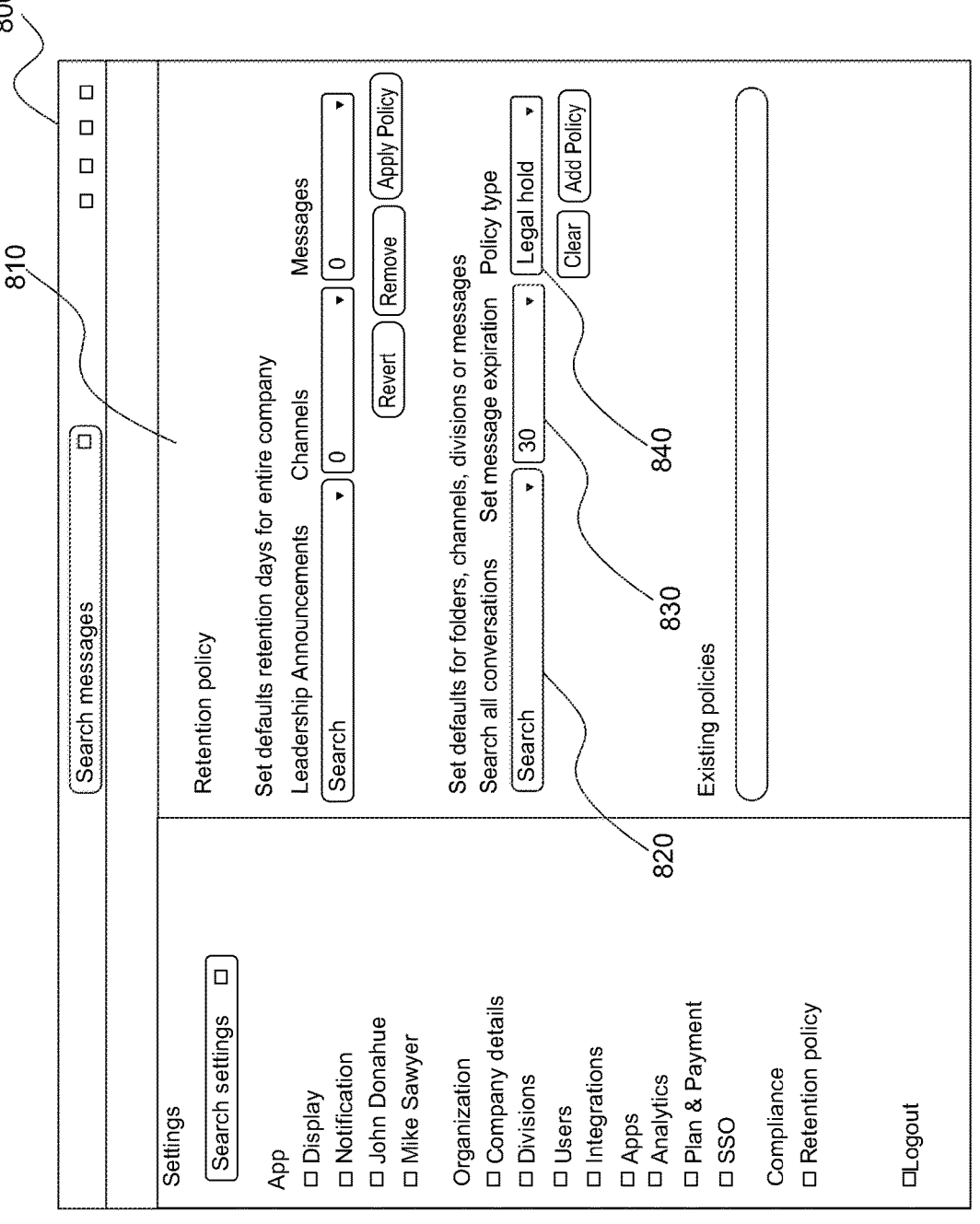
FIG. 8 is a diagram that illustrates a graphical user interface displaying a retention policy panel, according to some embodiments.

FIG. 8 is a diagram that illustrates a graphical user interface (GUI) 800 displaying a retention policy panel 810, according to some embodiments. GUI 800 is an example interface enabling a CO to set data retention policies within a matter folder. GUI 800 may be generated by messaging system 110 and/or displayed using administrator device 140. Administrator device 140 may receive GUI data from messaging system 110 to construct and/or display GUI 800. GUI 800 includes retention policy panel 810, search entry field 820, expiration entry field 830, and policy type field 840.

Retention policy panel 810 may enable a CO to set data retention policies and legal hold requirements for a matter folder. In one embodiment, search entry field 820 may allow a CO to enter a keyword and/or a search term to identify a message or file. The identification may identify files and/or messages within a particular chat channel selected and/or across multiple chat channels. Expiration entry field 830 may enable a CO to set a time limit for how long data associated with a matter folder may be stored within file database 118 before automatic deletion. Policy type field 840 may enable a CO to select a reason for the data retention. For example, a CO may specify that the policy type is a legal hold.

Example GUIs for Navigating a Managed Folder Structure

Figure 9:
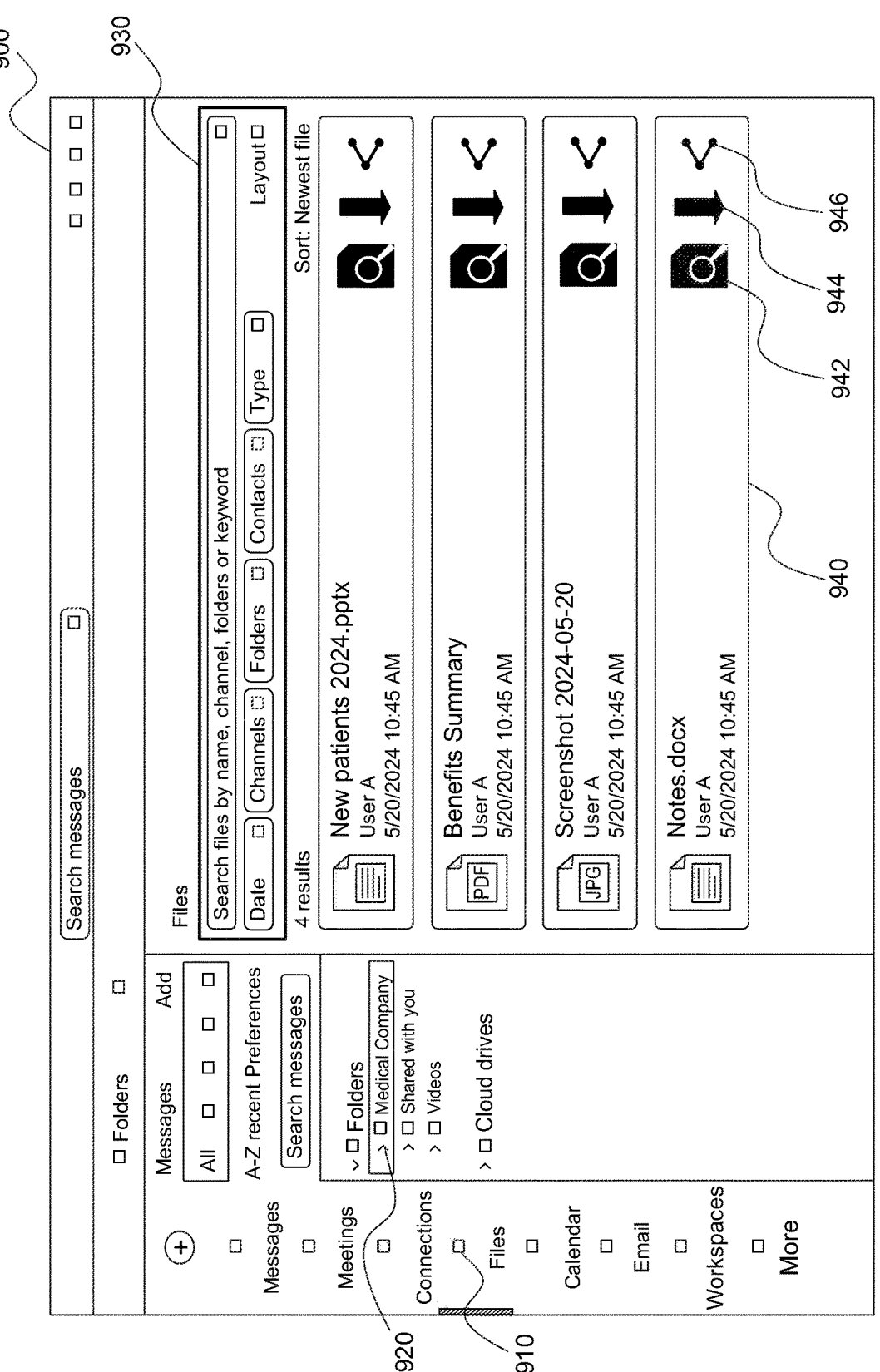
FIG. 9 is a diagram that illustrates a graphical user interface displaying files associated with a matter folder, according to some embodiments.
Figure 10:
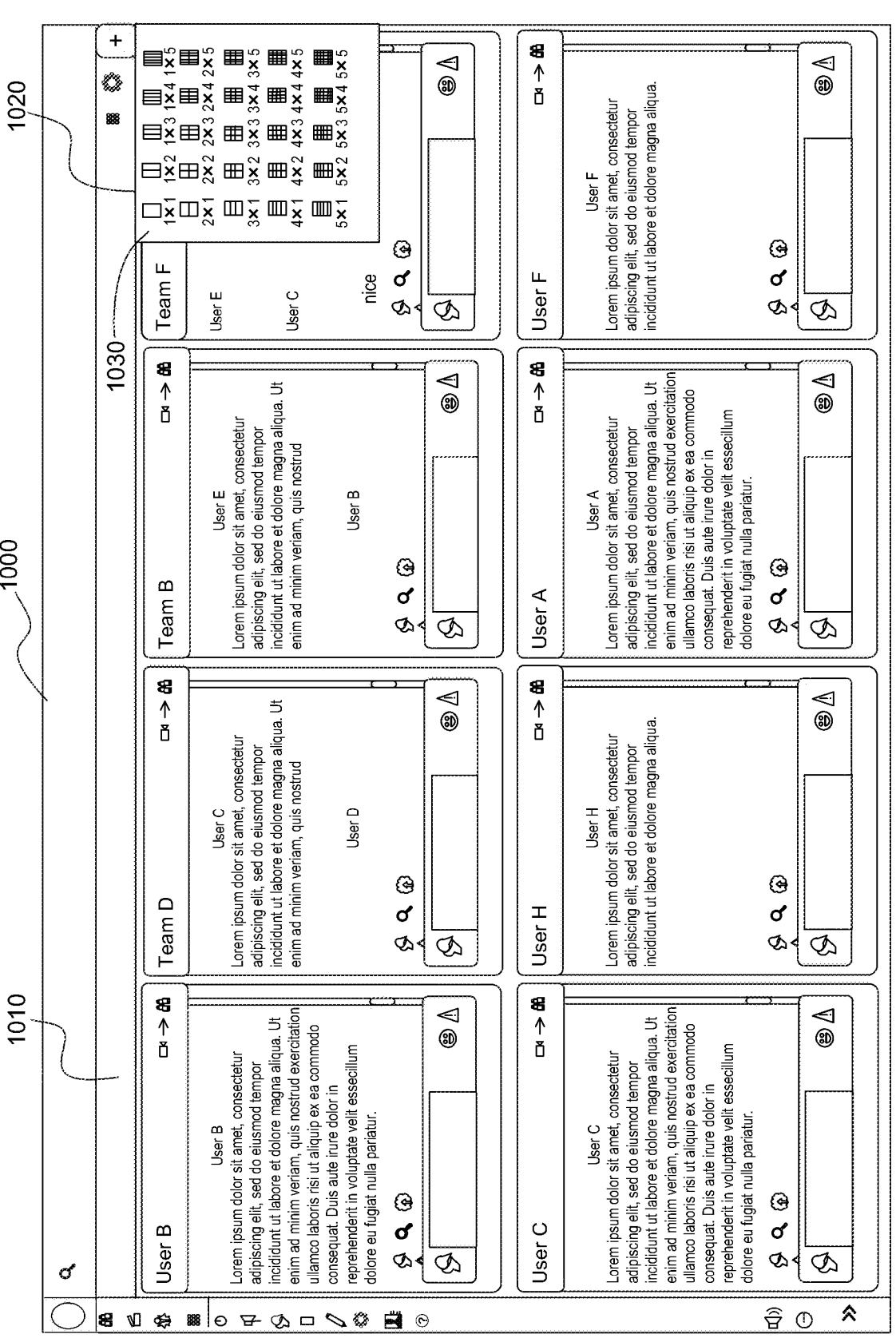
FIG. 10 is a diagram that illustrates a graphical user interface for configuring a workspace layout, according to some embodiments.
Figure 11:
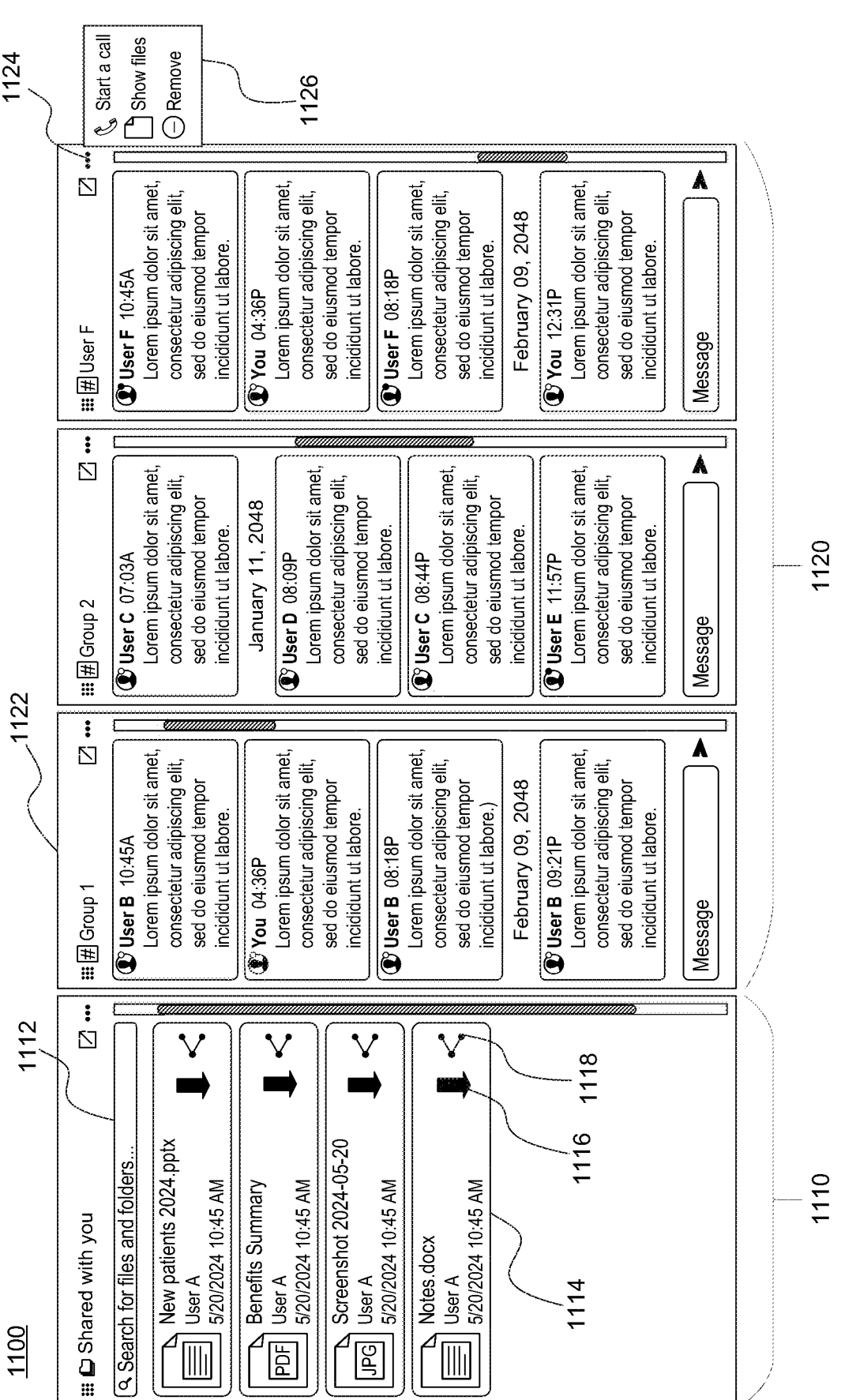
FIG. 11 is a diagram that illustrates a workspace graphical user interface displaying a file view and a chat channel view corresponding to a matter folder, according to some embodiments.

FIGS. 9-11 are diagrams of graphical user interfaces allowing users to interact with managed matter folders. The graphical user interfaces provide a visual representation of the associated functional aspects of having permissions to access a matter folder. The graphical user interface facilitates receiving inputs from a user. In an embodiment, the graphical user interface is a web-based graphical user interface, and can be accessed via any of the common web browsers, such as Internet Explorer, Firefox, Safari, Chrome, etc. In an embodiment, the graphical user interface is an application that runs on a device such as a laptop, computer, a smart phone, or a tablet.

FIG. 9 is a diagram that illustrates a graphical user interface (GUI) 900 displaying files 214 associated with a matter folder 210, according to some embodiments. Messaging system 110 may generate GUI 900 for display on user devices 130. GUI 900 may include files button 910, matter folder identifiers 920, a search bar 930, and/or a file display 940.

Files button 910 may be part of a toolbar allowing for navigation between different functionalities offered by messaging system 110. Upon selecting files button 910, matter folder identifiers 920 and/or a file display 940 may be displayed to a user having a role allowed within the permissions.

Matter folder identifiers 920 may identify one or more matter folders 210 created by a GMA and managed by at least one FA. GUI 900 may only display a list of matter folder identifiers 920 corresponding to matter folders 210 to which the user has the appropriate permissions to access. Upon selecting a particular one of matter folder identifiers 920, the user may view a corresponding file display 940 to view, download, and/or share files 214 related to the matter to which the user has access.

File display 940 may include one or more icons corresponding to files 214 and/or file folders. The displayed files 214 and/or file folders may correspond to the selected matter folder 210 chosen using its corresponding matter folder identifier 920. File display 940 may include icons such as, for example, a view button 942, a download button 944, and/or a share button 946. By interacting with the icons within file display 940, a user may explore the file contents of the matter folder 210.

By selecting view button 942, a user may be able to view the contents of a file 214. Depending on the user's permissions, the user may be able to only read the contents of the file 214 or may be able to read and modify the contents of the file 214. By selecting download button 944, a user may be able to download a local copy of a file 214 from file database 118 to a user device 130. By selecting share button 946, a user may be able to share a file 214 with a recipient such as, for example, another user. The recipient may have a role specified by the permissions to access files 214 within the matter folder 210. For example, when a user selects share button 946, a menu may be displayed. The menu may allow the user to identify another user of messaging system 110. For example, a list of users and/or a search bar may be available for the user to identify a recipient. When the user selects a recipient for sharing the file, messaging system 110 may transmit a link to the file in a chat panel to the recipient. The link may link to the file as stored and/or maintained by file database 118.

GUI 900 may include search bar 930. Search bar 930 may allow for searches of file folders and files stored on messaging system 110 related to a matter folder. Search results may display a list of file displays 940 representing files 214 related to a matter folder. Search bar 930 may enable a user to sort the search results. For example, a user may be able to filter the results by date, chat channels, file folders, contacts, or file type.

FIG. 10 is a diagram that illustrates a graphical user interface (GUI) 1000 for configuring a workspace layout, according to some embodiments. GUI 1000 may display a workspace 1010 which may include one or more chat panels. The chat panel may include different types of chat panels, such as, for example private message chat panels, team chat panels, and/or division chat panels. Workspace 1010 may include a starting configuration of chat panels. For example, the chat panels may be arranged in rows and columns. In an embodiment, a user may arrange chat panels in a free form manner without strict delineations. The client device and/or messaging system may then store location information associated with the chat panels to create the arrangement at a later time. The location information for a chat panel may be a coordinate relative to another chat panel, an absolute location value, and/or a combination. In an embodiment, the client device and/or messaging system may store data related to the sizing of a chat panel. This sizing data may be relative and/or absolute.

In an embodiment, GUI 1000 may provide layout menu 1020 which may include one or more selectable layouts 1030. Layout menu 1020 may initially be a hidden element on GUI 1000. A user may select an icon and/or provide a command to cause a client device to display layout menu 1020.

In an embodiment, layout menu 1020 may include one or more selectable layouts 1030. Layouts 1030 may include one or more pre-configured arrangements of chat panels. A user may select a layout 1030, causing workspace 1010 to arrange the chat panels according to the selected layout 1030. In an embodiment, this selection may inform the client device and/or the messaging system about the location and/or size of the chat panels. For example, a layout 1030 may indicate the number of rows and columns to be used, such as two rows by four columns. If the client device is generating workspace 1010, the client device is able to arrange the chat panels according to the chosen layout 1030. If a user chooses another layout 1030, the client device may adjust the chat panels according to the newly selected layout 1030.

In an embodiment, the client device may size the chat panels according to a selected layout 1030 and/or the size of the display screen showing workspace 1010. For example, the client device may divide a predetermined area to display the chat panels based on the size of the display screen. In an embodiment, this division may occur based on the number of chat panels selected to be displayed. For example, a user may select to view eight chat panels using two rows and four columns. Using a display screen ratio of 1600 pixels by 900 pixels, the client device may divide the total number of pixels by the selected layout 1030. In an embodiment, to display eight chat panels using two rows and four columns, each chat panel may be sized as being 400 pixels by 450 pixels. A skilled artisan may adjust these ratios and/or generate formulas that include pixel space for margins or space around a chat panel. In an embodiment, the client device may transmit metadata indicating a chosen layout 1030 to the messaging system. The messaging system may then store the chosen layout 1030 metadata as a parameter of workspace 1010.

FIG. 11 is a diagram that illustrates a workspace graphical user interface (GUI) 1100 displaying a file view 1110 and a chat channel view 1120 corresponding to a matter folder, according to some embodiments. Messaging system 110 may generate workspace GUI 1100 for display on user devices 130. Workspace GUI 1100 may be an embodiment of a workspace 1010 that a user arranged using GUI 1000 (discussed with reference to FIG. 10) for a particular matter folder. Workspace GUI 1100 may include file view 1110, chat channel view 1120, a search bar 1112, a file display 1114, a chat channel display 1122, and a chat options button 1124.

File view 1110 may represent a list of file displays 1114 corresponding to files 214 related to a particular matter folder 210 to which the user has a role specified in the permissions to access. File view 1110 may include search bar 1112. Search bar 1112 may allow for searches of file folders and files stored on messaging system 110 related to a matter folder. Search results may display a list of file displays 1114 representing files 214 related to a matter folder. Search bar 1112 may enable a user to sort the search results. For example, a user may be able to filter the results by date, chat channels, file folders, contacts, or file type.

File display 1114 may include one or more icons corresponding to files 214 and/or file folders. File display 1114 may include icons such as, for example, a download button 1116 and/or a share button 1118. By interacting with the icons within file display 1114, a user may explore the file contents of the matter folder 210 within the context of a workspace.

By selecting download button 1116, a user may be able to download a local copy of a file 214 from file database 118 to a user device 130. By selecting share button 1118, a user may be able to share a file 214 with a recipient such as, for example, another user. The recipient may have a role specified by the permissions to access files 214 within the matter folder 210. For example, when a user selects share button 1118, a menu may be displayed. The menu may allow the user to identify another user of messaging system 110. For example, a list of users and/or a search bar may be available for the user to identify a recipient. A user may be able to drag-and-drop a file into a chat channel display 1122 within chat channel view 1120 to share the file as a message with another user. When the user selects a recipient for sharing the file, messaging system 110 may transmit a link to the file in a chat panel to the recipient. The link may link to the file as stored and/or maintained by file database 118.

Messaging system 110 may facilitate chat and/or instant messaging between users with a chat channel view 1120 in the context of a workspace such as, for example, workspace GUI 1100. Chat channel view 1120 may include one or more chat channel displays 1122. A user may select a chat channel display 1122 from chat channel view 1120. A chat channel display 1122 may include private messages and/or messages to groups of users, such as teams working on a matter. Users may share files within a chat channel display 1122. To share a file, the user may have selected a particular file from file view 1110 and specified a particular user and/or chat channel display 1122 for sharing the file. Messaging system 110 may then post a link to the file in chat channel display 1122. This link may appear as a shared file message.

By selecting and/or interacting with a shared file message in a chat channel display 1122, users of the chat channel display 1122 associated with a matter folder may view, access, and/or share the file. In some embodiments, a user who has shared the file may delete the shared file message from the chat channel display 1122. In this case, messaging system 110 may delete the shared file message from appearing in the chat channel display 1122 accessed by other users.

Chat channel view 1120 may include an options button 1124 to interact with chat channel displays 1122 within a workspace. Upon selecting options button 1124, a user may view an options window 1126. Options window 1126 may enable a user to initiate a video or audio call with another user of a chat channel display 1122. Options window 1126 may enable a user to browse files shared within a particular chat channel display 1122, as an alternative to searching for files with search bar 1112 within file view 1110. Options window 1126 may enable a user to remove a chat channel display 1122 from workspace 1100 to alter the workspace layout. In an embodiment, options window 1126 may enable a user to mute a particular chat channel display 1122 for a set amount of time and/or indefinitely. Muting may turn off notifications for the particular chat channel display 1122.

In this example configuration, a user can navigate and share files while communicating with other users about a particular matter within the context of a workspace.

Example Computer System

Figure 12:
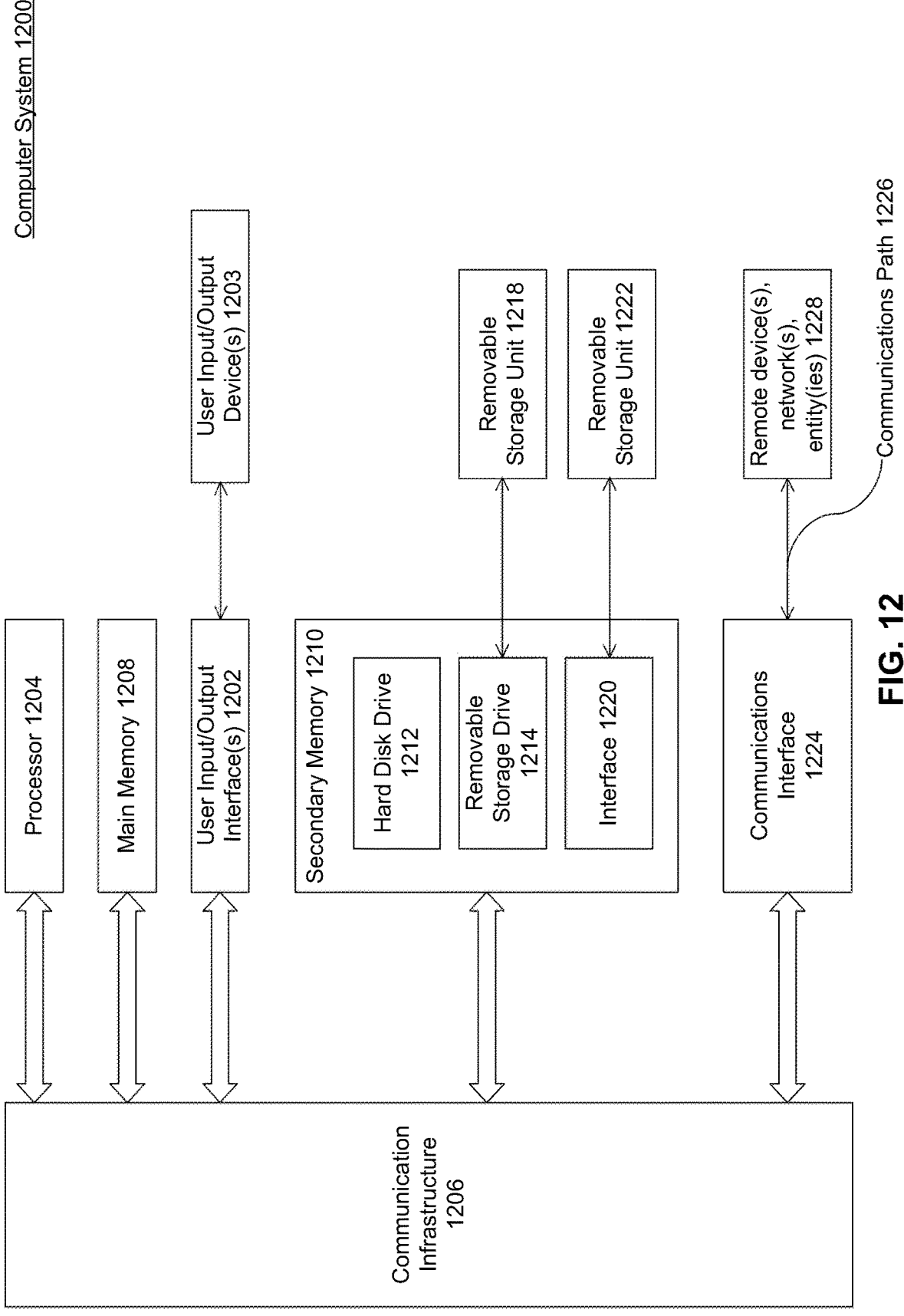
FIG. 12 is an example computer system useful for implementing various embodiments.

Various embodiments may be implemented, for example, using one or more well-known computer systems, such as computer system 1200 shown in FIG. 12. One or more computer systems 1200 may be used, for example, to implement any of the embodiments discussed herein, as well as combinations and sub-combinations thereof.

Computer system 1200 may include one or more processors (also called central processing units, or CPUs), such as a processor 1204. Processor 1204 may be connected to a communication infrastructure or bus 1206.

Computer system 1200 may also include user input/output device(s) 1203, such as monitors, keyboards, pointing devices, etc., which may communicate with communication infrastructure 1206 through user input/output interface(s) 1202.

One or more of processors 1204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 may also include a main or primary memory 1208, such as random access memory (RAM). Main memory 1208 may include one or more levels of cache. Main memory 1208 may have stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 may include a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 may read from and/or write to removable storage unit 1218.

Secondary memory 1210 may include other means, devices, components, instrumentalities or other approaches for allowing computer programs and/or other instructions and/or data to be accessed by computer system 1200. Such means, devices, components, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 may enable computer system 1200 to communicate and interact with any combination of external devices, external networks, external entities, etc. (individually and collectively referenced by reference number 1228). For example, communication interface 1224 may allow computer system 1200 to communicate with external or remote devices 1228 over communications path 1226, which may be wired and/or wireless (or a combination thereof), and which may include any combination of LANs, WANs, the Internet, etc. Control logic and/or data may be transmitted to and from computer system 1200 via communication path 1226.

Computer system 1200 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for managing folders, comprising:

generating, by a messaging server, a folder management graphical user interface (GUI) that includes a plurality of input fields for receiving commands;

receiving, by the messaging server and via the folder management GUI, a command from a global matter administrator to create a matter folder and permissions specifying which role a user must have to access the matter folder, the matter folder being configured to carry at least one file and chat channel;

in response to the command, generating, by the messaging server in a database, the matter folder;

controlling access to the matter folder as specified in the permissions such that the user is able to view or modify the at least one file and chat channel only if the user has a role allowed within the permissions;

storing characteristics of the matter folder in the database as a matter template specifying one or more chat channels and one or more users and their corresponding permissions associated with a type of matter;

receiving, by the messaging server and via the folder management GUI, a command from a user having administrative permissions to create a subsequent matter folder based on the matter template; and in response to the command, generating, by the messaging server in the database, the subsequent matter folder having the one or more chat channels and the one or more users and their corresponding permissions associated with the type of matter.

2. The computer-implemented method of claim 1, wherein access to the matter folder comprises at least one of read-only permissions of the at least one file and chat channel, permissions to edit content of the at least one file and chat channel, or administrative permissions to edit permissions for other users in the matter folder.

3. The computer-implemented method of claim 1, wherein the receiving the command from the global matter administrator comprises at least one of naming the matter folder, designating users having administrative permissions, or removing users having administrative permissions.

4. The computer-implemented method of claim 1, wherein the controlling access to the matter folder comprises permitting a user having administrative permissions to create any number of chat channels, delete any number of chat channels, assign users to any chat channel, remove users from any chat channel, enable use of chat channels, or disable use of chat channels within the matter folder.

5. The computer-implemented method of claim 1, wherein the controlling access to the matter folder comprises preventing the global matter administrator from viewing or modifying the at least one file and chat channel based on permissions for the global matter administrator.

6. The computer-implemented method of claim 1, wherein the controlling access to the matter folder comprises generating a workspace graphical user interface (GUI) comprising a user-specified layout of a file view and a chat channel view corresponding to the at least one file and chat channel in the matter folder to which the user has the role allowed within the permissions.

7. The computer-implemented method of claim 1, wherein the controlling access to the matter folder comprises permitting a user having compliance permissions to view the at least one file and chat channel in a read-only format, set a data retention policy for the at least one file and chat channel, or set a legal hold requirement for the at least one file and chat channel.

8. A system, comprising:

a database; and a messaging server configured to:

generate, by the messaging server, a folder management graphical user interface (GUI) that includes a plurality of input fields for receiving commands;

receive, by the messaging server and via the folder management GUI, a command from a global matter administrator to create a matter folder and permissions specifying which role a user must have to access the matter folder, the matter folder being configured to carry at least one file and chat channel;

in response to the command, generate, by the messaging server in the database, the matter folder;

control access to the matter folder as specified in the permissions such that the user is able to view or modify the at least one file and chat channel only if the user has a role allowed within the permissions;

store characteristics of the matter folder in the database as a matter template specifying one or more chat channels and one or more users and their corresponding permissions associated with a type of matter;

receive, by the messaging server and via the folder management GUI, a command from a user having administrative permissions to create a subsequent matter folder based on the matter template; and in response to the command, generate, by the messaging server in the database, the subsequent matter folder having the one or more chat channels and the one or more users and their corresponding permissions associated with the type of matter.

9. The system of claim 8, wherein access to the matter folder comprises at least one of read-only permissions of the at least one file and chat channel, permissions to edit content of the at least one file and chat channel, or administrative permissions to edit permissions for other users in the matter folder.

10. The system of claim 8, wherein the receiving the command from the global matter administrator comprises at least one of naming the matter folder, designating users having administrative permissions, or removing users having administrative permissions.

11. The system of claim 8, wherein the controlling access to the matter folder comprises permitting a user having administrative permissions to create any number of chat channels, delete any number of chat channels, assign users to any chat channel, remove users from any chat channel, enable use of chat channels, or disable use of chat channels within the matter folder.

12. The system of claim 8, wherein the controlling access to the matter folder comprises preventing the global matter administrator from viewing or modifying the at least one file and chat channel based on permissions for the global matter administrator.

13. The system of claim 8, wherein the controlling access to the matter folder comprises generating a workspace graphical user interface (GUI) comprising a user-specified layout of a file view and a chat channel view corresponding to the at least one file and chat channel in the matter folder to which the user has the role allowed within the permissions.

14. The system of claim 8, wherein the controlling access to the matter folder comprises permitting a user having compliance permissions to view the at least one file and chat channel in a read-only format, set a data retention policy for the at least one file and chat channel, or set a legal hold requirement for the at least one file and chat channel.

15. A non-transitory computer-readable device having instructions stored thereon that, when executed by at least one computing device, causes the at least one computing device to perform operations comprising:

generating, by a messaging server, a folder management graphical user interface (GUI) that includes a plurality of input fields for receiving commands;

receiving, by the messaging server and via the folder management GUI, a command from a global matter administrator to create a matter folder and permissions specifying which role a user must have to access the matter folder, the matter folder being configured to carry at least one file and chat channel;

in response to the command, generating, by the messaging server in a database, the matter folder;

controlling access to the matter folder as specified in the permissions such that the user is able to view or modify the at least one file and chat channel only if the user has a role allowed within the permissions;

storing characteristics of the matter folder in the database as a matter template specifying one or more chat channels and one or more users and their corresponding permissions associated with a type of matter;

receiving, by the messaging server and via the folder management GUI, a command from a user having administrative permissions to create a subsequent matter folder based on the matter template; and in response to the command, generating, by the messaging server in the database, the subsequent matter folder having the one or more chat channels and the one or more users and their corresponding permissions associated with the type of matter.

16. The non-transitory computer-readable device of claim 15, wherein access to the matter folder comprises at least one of read-only permissions of the at least one file and chat channel, permissions to edit content of the at least one file and chat channel, or administrative permissions to edit permissions for other users in the matter folder.

17. The non-transitory computer-readable device of claim 15, wherein the receiving the command from the global matter administrator comprises at least one of naming the matter folder, designating users having administrative permissions, or removing users having administrative permissions.

18. The non-transitory computer-readable device of claim 15, wherein the controlling access to the matter folder comprises permitting a user having administrative permissions to create any number of chat channels, delete any number of chat channels, assign users to any chat channel, remove users from any chat channel, enable use of chat channels, or disable use of chat channels within the matter folder.

19. The non-transitory computer-readable device of claim 15, wherein the controlling access to the matter folder comprises preventing the global matter administrator from viewing or modifying the at least one file and chat channel based on permissions for the global matter administrator.

20. The non-transitory computer-readable device of claim 15, wherein the controlling access to the matter folder comprises permitting a user having compliance permissions to view the at least one file and chat channel in a read-only format, set a data retention policy for the at least one file and chat channel, or set a legal hold requirement for the at least one file and chat channel.

* * * * *